US005474484A

United States Patent [19]

Lemelle

[11] Patent Number: 5,474,484
[45] Date of Patent: Dec. 12, 1995

[54] DOLL USED TO TEACH CHILDREN TO USE THE EMERGENCY 911 TELEPHONE NUMBERS

[76] Inventor: Julie A. Lemelle, c/o California Storybook Publishing P.O. Box 5424, South San Francisco, Calif. 94083

[21] Appl. No.: 302,237

[22] Filed: Sep. 8, 1994

Related U.S. Application Data

[63] Continuation of Ser. No. 46,021, Apr. 12, 1993, abandoned.

[51] Int. Cl.⁶ .......................... A63H 33/30; A63H 3/28; G09B 5/04; G09B 25/00
[52] U.S. Cl. .................. 446/142; 446/302; 446/408; 434/319; 434/365; 434/227
[58] Field of Search .................. 446/141, 142, 446/143, 297, 299, 300, 301, 302, 397, 404, 408; 434/319, 365, 226, 227, 185; D21/180; D14/143

[56] References Cited

U.S. PATENT DOCUMENTS

| D. 250,023 | 10/1978 | Perkins et al. | D21/111 X |
|---|---|---|---|
| D. 291,568 | 8/1987 | Basch | D14/143 |
| D. 294,143 | 2/1988 | Gobindram | D21/111 X |
| 2,973,586 | 3/1961 | Robertson . | |
| 3,548,536 | 12/1970 | Glass . | |
| 3,593,433 | 7/1971 | Dillon . | |
| 3,702,515 | 11/1972 | Beasley et al. | 446/142 |
| 3,757,463 | 9/1973 | Breslow et al. | 446/141 |
| 3,942,268 | 3/1976 | Wilson | 434/319 X |
| 3,949,488 | 4/1976 | Welch . | |
| 4,103,452 | 8/1978 | Wood | 446/142 |
| 4,158,931 | 6/1979 | Terzian | 446/142 |
| 4,249,338 | 2/1981 | Wexler | 446/303 |
| 4,358,278 | 11/1982 | Goldfarb | 434/227 X |
| 4,451,911 | 5/1984 | Klose et al. | 446/303 X |
| 4,516,950 | 5/1985 | Berman et al. | 446/297 |
| 4,521,205 | 6/1985 | Spector . | |
| 4,536,160 | 8/1985 | Hatfield | 424/227 |
| 4,642,054 | 2/1987 | Wada | 446/141 X |
| 4,696,653 | 9/1987 | McKeefery . | |
| 4,828,527 | 5/1989 | Spector . | |
| 4,866,764 | 9/1989 | Barker, III | 40/337 X |
| 4,878,871 | 11/1989 | Noto | 446/297 X |
| 5,011,449 | 4/1991 | Handy et al. | 446/303 X |
| 5,184,971 | 2/1993 | Williams | 446/143 X |
| 5,195,126 | 3/1993 | Carrier et al. | 379/51 X |
| 5,209,665 | 5/1993 | Billings et al. | 446/143 X |
| 5,279,514 | 1/1994 | Lacombe et al. | 446/297 |

FOREIGN PATENT DOCUMENTS

| 1248355 | 1/1989 | Canada . | |
|---|---|---|---|
| 1276721 | 10/1961 | France | 446/303 |
| 2737177 | 3/1979 | Germany | 446/303 |
| 3710135 | 10/1988 | Germany | 446/142 |

OTHER PUBLICATIONS

V Tech catalog, date 1992.
Washington Post, May 28, 1978 p. L12.

Primary Examiner—Robert A. Hafer
Assistant Examiner—D. Neal Muir
Attorney, Agent, or Firm—Julian Caplan; Flehr, Hohbach, Test, Albritton & Herbert

[57] ABSTRACT

To educate children how to use the emergency 911 telephone number, a talking doll displays the twelve keys of a conventional telephone instrument. Within the chest of the doll or mounted externally is a tape player having a pre-recorded tape of the words likely to be used by an emergency dispatcher at a "911 number". These include reassuring instructions, inquiries as to the name and address of the child and the nature of the emergency. Hence the user pushes the sequence of buttons "9", "1" and "1". This activates playing the recorded tape. At the end of the tape message, the tape automatically rewinds. A telephone instrument may be suspended on the doll in such manner that a switch is closed when the instrument is lifted from the hook before depressing the "9", "1", "1" buttons.

2 Claims, 2 Drawing Sheets

5,474,484

DOLL USED TO TEACH CHILDREN TO USE THE EMERGENCY 911 TELEPHONE NUMBERS

This is a continuation, of application Ser. No. 08/046,021, filed Apr. 12, 1993 now abandoned.

BACKGROUND OF THE INVENTION

1. Field of the Invention

This invention relates to a new and improved talking doll which may be used to teach children proper use of the emergency "911" telephone number. More particularly, the invention relates to a uniformed "911" dispatcher doll which may be male or female having incorporated therein a series of buttons in the pattern of a touch-tone telephone instrument and an imitation telephone instrument. When the child lifts the telephone instrument from a socket in the doll and dials the numerals "9", "1" and "1" in proper sequence, a tape recorder is activated which has a recorded message asking the child the usual questions which a "911" dispatcher would ask in an emergency.

2. Description of Related Art

Toy telephones incorporating tape recorded messages are known in the art. Thus in one type of phone, by lifting an instrument from its socket and touching certain buttons, specific messages related to individual buttons are delivered.

U.S. Pat. No. 4,696,653 discloses a talking doll with multiple switches. U.S. Pat. No. 2,973,586 shows an educational toy telephone. U.S. Pat. No. 3,548,536 shows a telephone which plays a particular message when a particular number is dialed.

The present invention differs from the prior art in that it requires that the child touch certain buttons corresponding to the numbers "9", "1" and "1" in proper sequence and then delivers a message which is characteristic of what an emergency dispatcher would speak over the telephone to a child who had dialed "911".

SUMMARY OF THE INVENTION

A doll has incorporated in a convenient place such as the front of the doll inside or over the chest cavity a panel having a cover under which is a tape recorder and batteries to activate the tape recorder. The doll may be a uniformed doll dressed as a "911" dispatcher might be dressed or as a child using the "911" service might be dressed. The panel may be mounted elsewhere, such as being recessed in the chest cavity of the doll. On the front of the cover is displayed a pattern of numbers and symbols duplicating that on the handset of a conventional telephone. Holes in the cover provide sockets for the opposite ends of an imitation telephone handset. The doll may be constructed with flexible arms to support the telephone instrument.

When the child lifts the instrument from its sockets, a switch is closed When the numerals "9", "1" and "1" are dialed in proper sequence, the tape recorder is activated.

A pre-recorded message on the tape recorder has a series of statements and questions which a dispatcher would ordinarily ask of a child who dials "911".

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Figure 1:
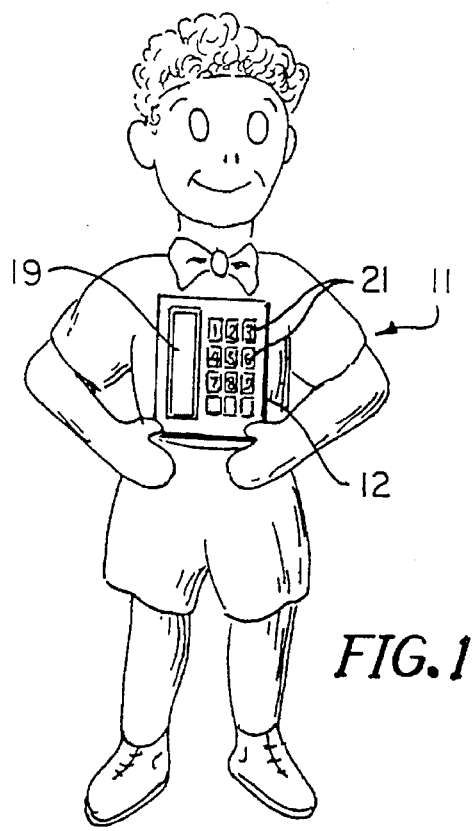
FIG. 1 is a schematic front, elevational view of a child doll in accordance with the present invention.
Figure 2:
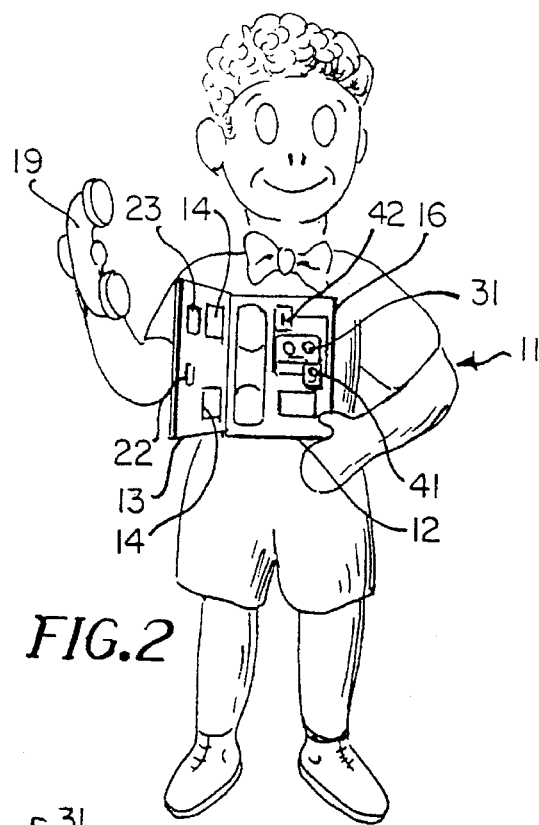
FIG. 2 is a view similar to FIG. 1 showing the cover of the panel on the front of the doll open.
Figure 4:
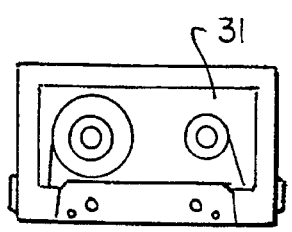
FIG. 4 is a schematic elevational view of a cassette for use in the tape recorder.
Figure 1A:
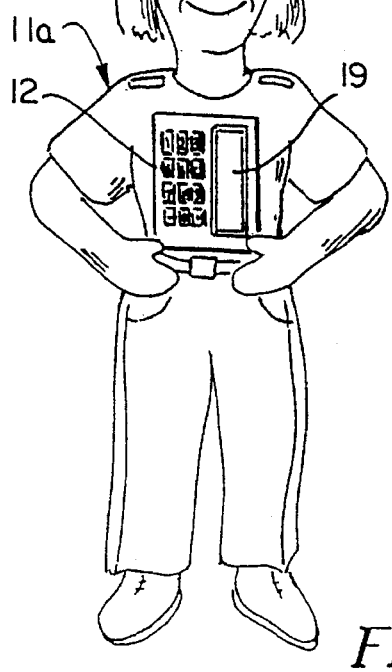
FIG. 1A is a view similar to FIG. 1 of a uniformed "911" dispatcher doll.

FIG. 1 shows a male child doll 11. It will be understood that the doll representation is optional and that other figures may be employed. Mounted on the front of the doll 11 or recessed into the doll's chest cavity is a box 12. FIG. 2 shows a cover 13 hinged along one side edge. Openings 14 at the top and bottom of one side of cover 13 are dimensioned to receive the opposed ends of a telephone handset 19. The handset may be installed on the cover 13 so that the opposite ends thereof are received in and are supported by openings 14. The child may take the handset 19 from its hang-up position on cover 13.

Figure 3:
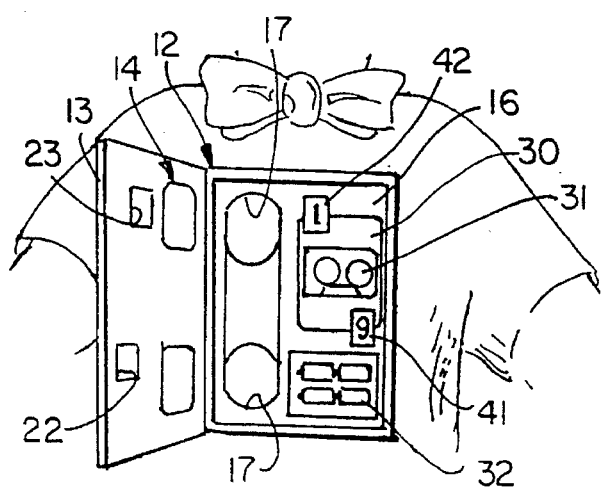
FIG. 3 is an enlarged view of a portion of the structure of FIG. 2.

FIG. 3 in particular illustrates the casing 16 underlying the top panel 13 or cover. It will be seen that there are pockets 17 in registry with the openings 14 into which the opposite ends of the handset 19 may be received. Not shown is a normally open switch 24 which is closed when the weight of the handset 19 is removed.

Displayed on the cover 13 are the numerals and symbols 21 characteristic of a conventional telephone instrument. There is an opening 22 in cover 13 in registry with the numeral "9" and another opening 23 in registry with the numeral "1". Mounted on casing 16 is a key 41 which resembles the key of a conventional handset of the numeral "9" and which underlies the opening 22. Similarly key 42 which carries the numeral "1" underlies the opening 23. Thus the child who is properly pressing the numeral "9" inserts a finger through the opening 22 and touches the key thereby, as hereinafter explained, closing switch 26. Similarly to dial the number "1", the finger is inserted through the opening 23 to touch key 42. The first time the "1" is touched switch 27 is closed; the second time switch 28 is closed.

Within the panel 16 is a tape recorder 30 having a cassette 31. Recorder 30 has an automatic rewind. Batteries 32 are inserted in proper sockets to activate the recorder 30.

A message is pre-recorded on cassette 31 containing a series of comments and questions which a dispatcher would normally convey to a child. Typically a girl doll "Jody" or a boy doll "Frankie" represent friendly, fanciful characters introduced to the child as his or her safety friend. A typical dialog might be as follows, "Hello, my name is Jody (or Frankie). I am your safety friend. I am here to help you learn how to dial "911" when you need help. In case of an emergency, dial "911" on the real telephone. When the "911" dispatcher answers, tell her your name, tell her your address, tell her what is happening. Stay on the real telephone and talk to the "911" dispatcher, and help will be sent quickly." The message may also be more in the nature of questions and answers wherein the voice on the recorder asks for the name and address and the nature of the emergency.

Another typical recorded message when the doll is a dispatcher might be: "Hello this is your "911" Dispatcher. Can you tell me what is happening? Can you tell me who needs help? What is your name? How old are you? Where are you? What is your address? Don't hang up. Stay on the phone. Help is on the way."

Figure 5:
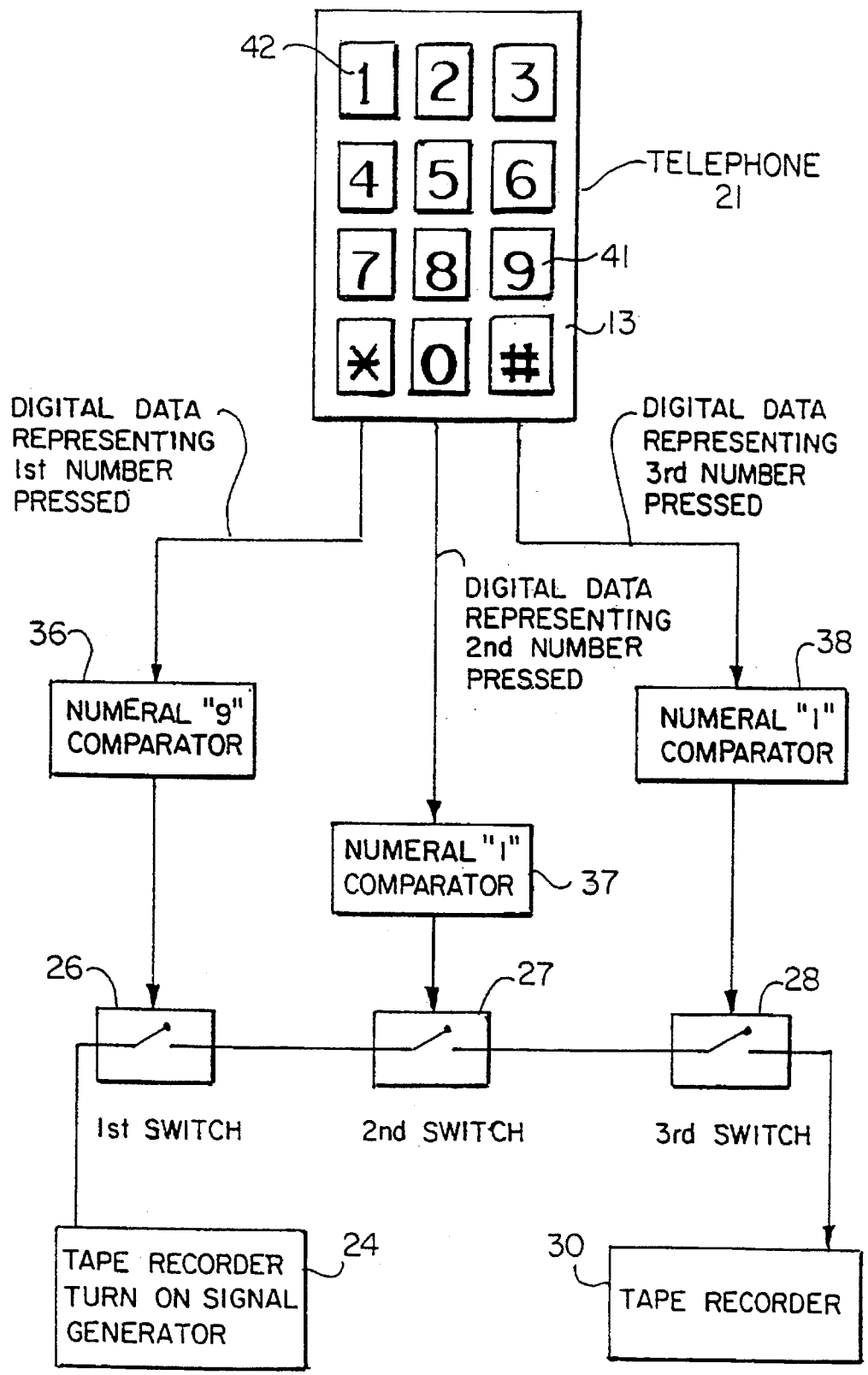
FIG. 5 is a schematic block diagram of one possible type of circuit to activate the recorder.

Directing attention to block diagram FIG. 5, the conventional touch tone dial keys are illustrated. Switch 24 turns on the circuitry when the handset 19 is lifted. When numeral "9" key 41 is touched, digital data signals representing that number is fed into comparator 36; if correct, switch 26 is closed. Similarly comparator 37 sensing touching "1" key 42 the first time controls switch 27; touching "1" key 42 the second time is sensed by comparator 38 to control closing switch 28. When switches 26, 27 and 28 are all closed, tape recorder 30 plays the message pre-recorded on cassette 31, rewinds and turns off the circuitry.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

I claim:

1. In combination, a doll having an exterior, a casing mounted on and recessed into a chest cavity of said doll and exposed to an observer, a tape player and cassette therefor mounted in said casing, a handset in electronic communication with said tape player said cassette having a pre-recorded message simulating likely questions asked by a "911" operator of a child in an emergency, said casing having a cover hinged to said casing a plurality of keys arranged in three columns and four rows on said cover totaling twelve keys simulating the pattern of touch-tone telephone keys, said keys being exposed to the exterior of said doll, said keys comprising a first key and a second key associated with the display of indicia of the numerals "9" and "1", respectively, beneath said cover on said casing a first switch located in said casing below the "9" indicium and a second switch in said casing below the "1" indicium, said cover being formed with a first hole in the location over said first key and a second hole in the location over the second key, and an electrical circuit in said casing to energize said tape player only upon depressing in sequence the first key, the second key and then the second key again, said tape player playing back said pre-recorded message when said circuit is energized.

2. The combination of claim 1 which further comprises the handset formed with first and second protruding ends, said casing being formed with first and second depressions to receive said first and second ends, and a normally closed switch in said electrical circuit associated with one said depression to be opened when a protruding end is located in said one said depression and to be closed when said last mentioned end is removed from said one said depressions, said normally closed switch energizing said electrical circuit, said cover over said casing being formed with first and second holes overlying said first and second depressions for passage of said first and second protruding ends through said cover and into said first and second depressions, respectively.

\* \* \* \* \*